(12) United States Patent
Thesling et al.

(10) Patent No.: US 8,170,158 B2
(45) Date of Patent: May 1, 2012

(54) DIGITAL CROSS-POLAR INTERFERENCE CANCELLATION

(75) Inventors: William H. Thesling, Hudson, OH (US); Richard T. Gedney, Avon, OH (US); Matthew D. Nimon, Hinckley, OH (US); Fan Mo, Stow, OH (US)

(73) Assignee: ViaSat, Inc., Carlsbad, CA (US)

( * ) Notice: Subject to any disclaimer, the term of this patent is extended or adjusted under 35 U.S.C. 154(b) by 683 days.

(21) Appl. No.: 12/242,147

(22) Filed: Sep. 30, 2008

(65) Prior Publication Data

US 2009/0086862 A1  Apr. 2, 2009

Related U.S. Application Data

(60) Provisional application No. 60/976,647, filed on Oct. 1, 2007.

(51) Int. Cl.
H03D 1/04 (2006.01)
(52) U.S. Cl. ........ 375/346; 375/340; 370/320; 370/335; 708/422
(58) Field of Classification Search ............. 375/346
See application file for complete search history.

(56) References Cited

U.S. PATENT DOCUMENTS

| | | | | |
|---|---|---|---|---|
| 4,438,530 A | * | 3/1984 | Steinberger | 455/278.1 |
| 5,621,410 A | * | 4/1997 | Gray et al. | 342/26 D |
| 5,732,105 A | * | 3/1998 | Andren et al. | 375/226 |
| 5,901,343 A | | 5/1999 | Lange | |
| 5,905,574 A | * | 5/1999 | Vollbrecht et al. | 356/491 |
| 6,236,263 B1 | * | 5/2001 | Iwamatsu | 329/306 |
| 7,720,136 B2 | * | 5/2010 | Friedman et al. | 375/220 |
| 2010/0022193 A1 | * | 1/2010 | Melis et al. | 455/73 |

FOREIGN PATENT DOCUMENTS
WO  2009/046120 A1  9/2009

OTHER PUBLICATIONS

International Search Report and Written Opinion dated Dec. 22, 2008, corresponding to PCT Application No. PCT/US2008/078468, filed Oct. 1, 2008, 10 pages.
Communication from European Patent Office for European Patent Application No. 08 835 92.1, mailed on Mar. 14, 2011, 6 pages.

* cited by examiner

*Primary Examiner* — Chieh M Fan
*Assistant Examiner* — Santiago Garcia
(74) *Attorney, Agent, or Firm* — Kilpatrick Townsend & Stockton LLP

(57) ABSTRACT

Cross-polar interference cancellation in a dual-polarization system is described. A terminal in a satellite communication system may receive a first communication signal in a first polarization and a second communication signal in a second polarization substantially orthogonal to the first polarization. The terminal may correlate in-phase or quadrature components of the first communication signal with in-phase or quadrature components of the second communication signal to generate one or more correlation measurements. Correction terms may be generated, using the correlation measurements, to remove at least some of the cross-polar interference.

25 Claims, 9 Drawing Sheets

DIGITAL CROSS-POLAR INTERFERENCE CANCELLATION

CROSS REFERENCES

This application claims priority from co-pending U.S. Provisional Patent Application No. 60/976,647, filed Oct. 1, 2007, entitled "DIGITAL CROSS-POLAR INTERFERENCE CANCELLATION", which is hereby incorporated by reference, as if set forth in full in this document, for all purposes.

BACKGROUND

The present invention relates to wireless communications in general and, in particular, to wireless dual-polarized transmissions.

Dual-polarized data transmission typically involves the simultaneous transmission of independent signals on different polarizations in the same wireless channel. Specifically, dual-polarized data transmission may be used to increase capacity in satellite communications.

However, the polarization orthogonality of the propagation field may not be perfectly preserved in certain transmission environments. Also, antenna and waveguide networks may not be able to achieve absolute polarization isolation. Thus, cross-polarization interference may be caused by antenna orientation or a number of other factors. Cross-polarization interference may be a source of significant performance degradation in dual-polar systems. It may, therefore, be desirable to utilize novel techniques in limiting cross-polarization interference.

SUMMARY

Systems, methods, devices, and processors are described for removing at least some of the cross-polar interference in a dual-polarization system. In some embodiments, a terminal in a satellite communication system may receive a first communication signal in a first polarization and a second communication signal in a second polarization substantially orthogonal to the first polarization. The terminal may correlate one or more components of the first communication signal with one or more components of the second communication signal to generate a correlation measurement. The terminal may generate, using the correlation measurement, correction terms to remove at least some of the cross-polar interference from at least one of the first or second communication signals.

In one set of embodiments, a first communication signal in a first polarization is processed to generate digitized in-phase and quadrature components of the first communication signal. A second communication signal in a second polarization substantially orthogonal to the first polarization is processed to generate digitized in-phase and quadrature components of the second communication signal. At least one of the digitized in-phase or quadrature components of the first communication signal may be correlated with at least one of the digitized in-phase or quadrature components of the second communication signal to generate one or more correlation measurements. One or more correction terms may be generated, using the correlation measurement, to remove at least some of the cross-polar interference from digitized in-phase or quadrature components of the first communication signal.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, devices, and processors are described for cross-polar interference cancellation in a dual-polarization system. In some embodiments, a terminal in a satellite communication system may receive a first communication signal in a first polarization and a second communication signal in a second polarization substantially orthogonal to the first polarization. The terminal may correlate in-phase or quadrature components of the first communication signal with in-phase or quadrature components of the second communication signal to generate one or more correlation measurements. Correction terms may be generated, using the correlation measurements, to remove at least some of the cross-polar interference from one or both of the communication signals.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features and elements described with respect to certain embodiments may be combined in various other embodiments.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, and software are described for identifying and mitigating cross-polar interference in a dual-polarization system. Digital signals from each polarization (e.g., vertical and horizontal) may be correlated to generate correlation measurements between the signals of each polarization. The correlation measurements may be used to generate correction terms to remove the interference.

Figure 1:
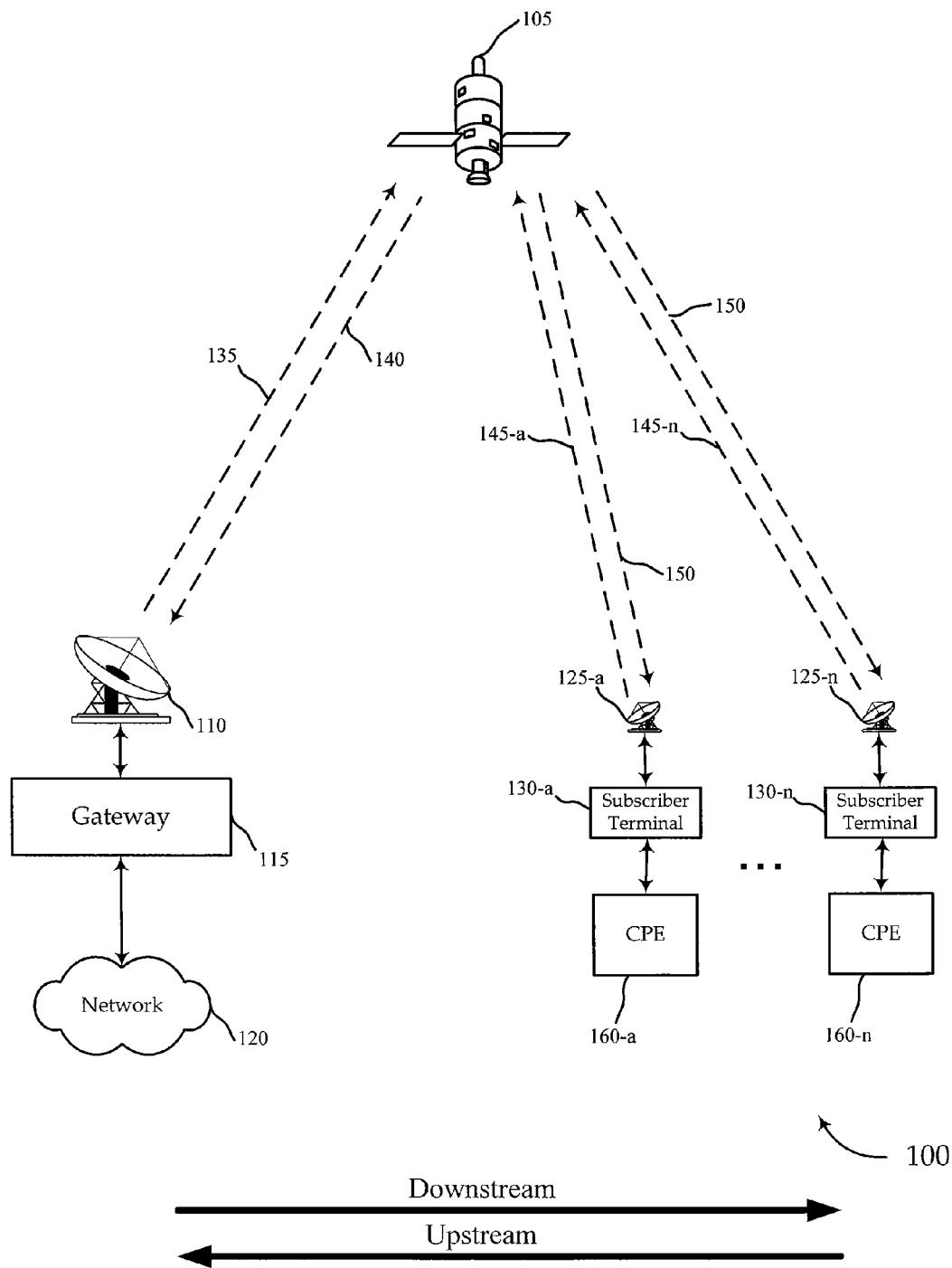
FIG. 1 is a block diagram of a satellite communications system configured according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105. Communications links 135, 140, 145, 150 to and from the satellite 105 may be via dual-polarized transmissions.

The network 120 may be any type of network and can include, for example, the Internet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links.

The gateway 115 provides an interface between the network 120 and the subscriber terminals 130. The gateway 115 may be configured to receive or otherwise generate data directed to one or more subscriber terminals 130. The gateway 115 may format the data for transmission on downstream links 135, 150 to the respective subscriber terminals 130 via the satellite 105. The downstream links 135, 150 may each consist of dual-polarized data transmissions. Similarly, subscriber terminals 130 may be configured to format data for transmission on upstream links 140, 145 directed to a gateway 115 via the satellite 105. Upstream links 140, 145 may consist of dual-polarized data transmissions. In various embodiments, a range of channelization schemes may be used on the various links, such as Time Division Multiple Access (TDMA), Frequency Division Multiple Access (FDMA), Orthogonal Frequency Division Multiple Access (OFDMA), Code Division Multiple Access (CDMA), or any number of combination, hybrid, or other schemes known in the art.

The gateway 115 may, therefore, format a frame in accordance with a physical layer definition for transmission via the satellite 105 on downstream links 135, 150. For a dual-polarized gateway transmission on a given channel, each polarization may be used to independently transmit data. A variety of physical layer transmission modulation and coding techniques may be used with certain embodiments of the invention, including those defined with the DVB-S2 and WiMAX standards, or various modifications thereof. The gateway 115 may also utilize Adaptive Coding and Modulation ("ACM") in conjunction with one or more of the downstream techniques described herein to direct messages to the individual terminals.

The gateway 115 may use an antenna 110 to transmit the signal to the satellite 105. In one embodiment, the antenna 110 is a parabolic reflector configured for dual-polarization transmission with high directivity in the direction of the satellite and low directivity in other directions. The downstream signals 135, 150 may include, for example, one (or more) single carrier signals. In one embodiment, a geostationary satellite 105 is configured to receive dual-polarized signals from the location of antenna 110, and then retransmit the dual-polarized signals. The satellite 105 may be configured as a "bent pipe" satellite, wherein the satellite may frequency-convert the received carrier signals before retransmitting the polarized signals to their destination, but otherwise perform little or no other processing on the contents of the polarized signals. In other embodiments, a satellite may perform additional processing (e.g., acting as a switch or router). In such embodiment, the cross-polarization interference cancellation techniques described herein may be performed on the satellite.

The signals transmitted from the satellite 105 may be received by one or more subscriber terminals 130, via the respective subscriber antenna 125. In one embodiment, the antenna 125 and subscriber terminal 130 together make up a very small aperture terminal (VSAT). In other embodiments, a variety of other types of dual-polar antennas 125 may be used at the subscriber terminal 130 to receive the signal from the satellite 105. The signals from the satellite 105 may be received by the subscriber within the frequency band and specific polarization transmitted. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

As noted above, a variety of transmission schemes (e.g., MF-TDMA) may be used for upstream links 140, 145, allowing efficient streaming of traffic while maintaining flexibility in allocating capacity among each of the subscriber terminals 130. A subscriber terminal 130, using the upstream links, may transmit to the gateway 115 current or future bandwidth needs or requests, requests for applications or services, information related to signal quality, etc. As noted, dual-polarization techniques may be used on either, or both, of the upstream links 140, 145, as well. For a dual-polarized transmission system, each polarization on a given channel may independently carry data to be received at the gateway 115.

In one embodiment, some subscriber terminals 130 are configured to transmit in a horizontal polarization, and others are configured to transmit in a vertical polarization. In another embodiment, a subscriber terminal 130 may, dynamically or otherwise, change transmission polarities. In still other embodiments, a subscriber terminal 130 may perform dual-polarization transmissions on each polarization simultaneously. Similar options may be implemented at a gateway 115.

Systems, devices, methods, and software will now be described for mitigating cross-polar interference in a dual-polar system. As noted above, dual-polarization techniques may be used on upstream links 140, 145 or downstream links 135, 150. Thus, the mitigation techniques discussed herein may be performed at the gateway 115, the satellite 105, or the subscriber terminal 130. Therefore, the techniques discussed may be used in any such devices, or other devices (e.g., other wireless communication devices) receiving dual-polarized data transmissions.

In typical dual-polarized transmissions, two independent signals travel in orthogonal polarizations (e.g., horizontal and vertical). In each polarization, there are typically two orthogonal signals, which are the in-phase (I) and quadrature (Q) components of each independent signal. As such, the dual-polarized transmission can also be analyzed as a 4-D transmission, with four signals traveling in four orthogonal channels.

Figure 2:
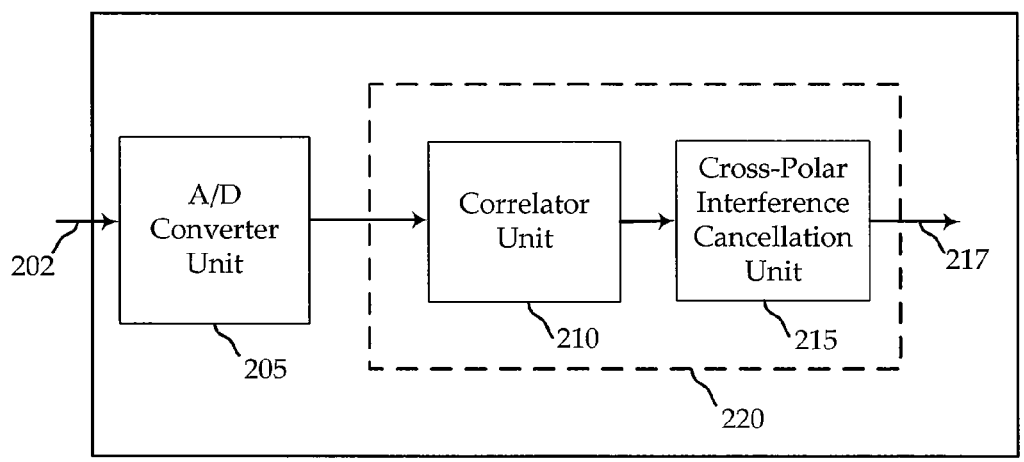
FIG. 2 is a block diagram of a device configured according to various embodiments of the invention.

Turning to FIG. 2, a block diagram illustrating a device 200 for mitigating cross-polar interference is illustrated. This device may be the satellite 105, terminal 130, or gateway 115 of FIG. 1. Wireless communication signals 202 may be received at the device 200, including a first communication signal in a first polarization and a second communication signal in a second polarization substantially orthogonal to the first polarization. These signals may (perhaps after some initial processing) be received by an A/D converter unit 205. The A/D converter unit 205 may process the first communication to generate digitized I and Q components of the first signal, and may process the second communication signal to generate digitized I and Q components of the second signal.

A correlator unit 210 may then correlate the digitized I or Q components of the first communication signal with the digitized I or Q components of the second communication signal to generate one or more correlation measurements. A cross-polar interference cancellation unit 215 may then generate one or more correction terms using the correlation measurement. The cross-polar interference cancellation unit 215 may then remove (e.g., cancel or otherwise mitigate) some of the cross polar interference from one of the digitized I and Q components of the first communication signal by applying the one or more correction terms. A corrected signal 217 (e.g., the corrected first communication signal) may then be output (e.g., for processing by a demodulator).

In one embodiment, the correlator unit 210 correlates the digitized Q component of the first communication signal and the digitized Q component of the second communication signal to generate a first portion of the correlation measurement. The correlator unit 210 correlates the digitized Q component of the first communication signal and the digitized I component of the second communication signal to generate a second portion of the correlation measurement. The cross-polar interference cancellation unit 215 may then generate a first correction term based on the first portion of the correlation measurement and a second correction term based on the second portion of the correlation measurement. The cross-polar interference cancellation unit 215 may remove cross-polar interference from the digitized Q component of the first communication signal using the first and second correction terms. Similar cross-polar correlations and correction term generation may occur for the digitized I component of the first communication signal to remove cross-polar interference.

The correlator unit 210 and cross-polar interference cancellation unit 215 may be implemented on a single processor utilizing digital logic. The correlator unit 210 and cross-polar interference cancellation unit 215 may together make up or be a part of an interference canceller 220, which may perform additional functions as well. For example, an interference canceller 220 may have the correlator unit 210 correlate the digitized quadrature component of the first communication signal with the digitized I component of the first communication signal to generate an additional correlation measurement. The interference canceller 220 may also include an IQ channel interference cancellation unit (not shown) to generate an IQ channel interference correction term, using the additional correlation measurement. This unit may use the IQ channel interference correction term to remove part of the in-phase-quadrature channel interference from the digitized I or Q components of the first communication signal. An interference canceller 220 may also include DC removal and adaptive equalization functionality, which will be described in more detail below.

Figure 3:
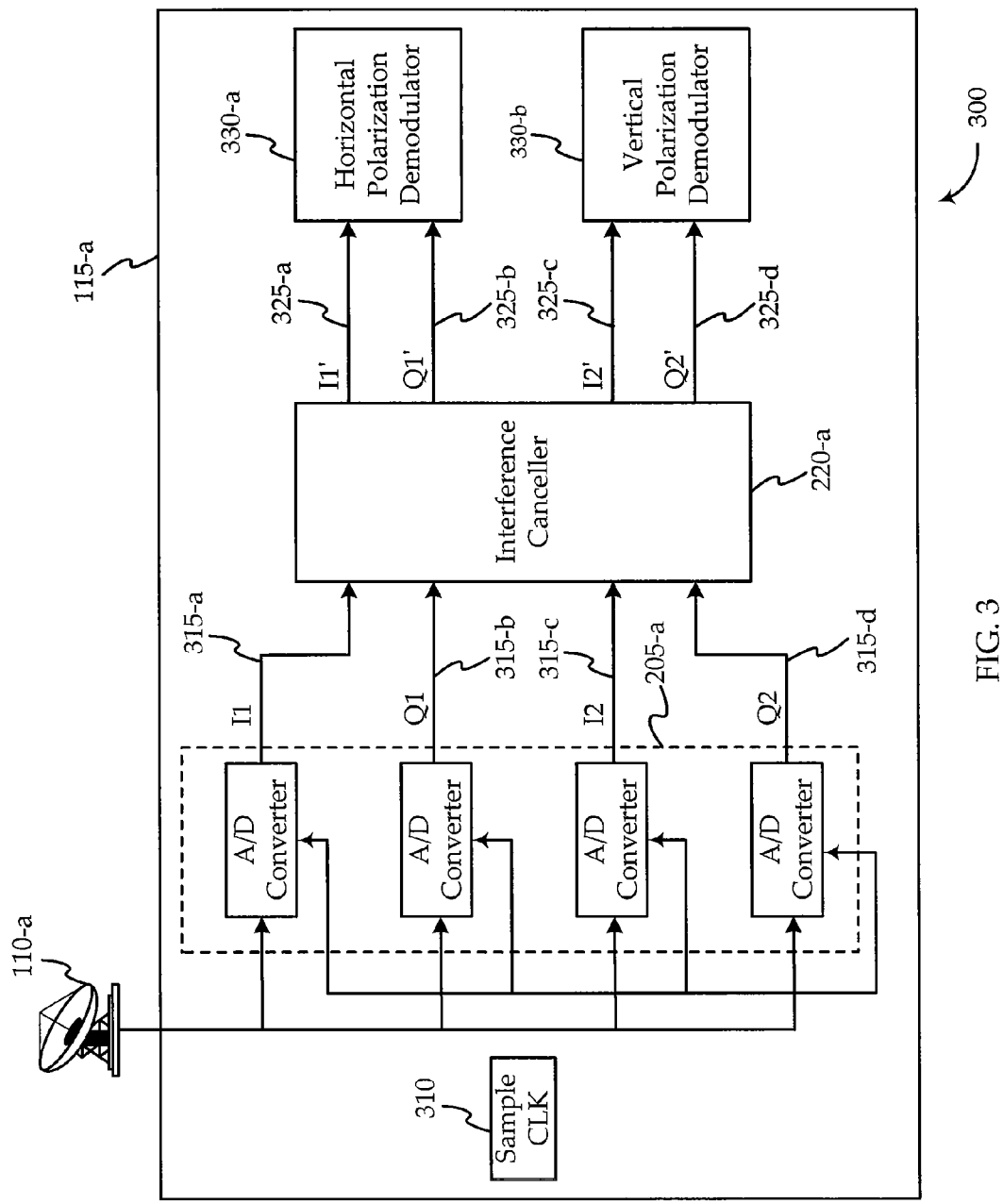
FIG. 3 is a block diagram of a gateway device configured according to various embodiments of the invention.

Referring to FIG. 3, a example configuration 300 at a gateway 115-*a* is shown. Note that while this may be the gateway 115 of FIG. 1, aspects of this configuration may be used in a variety of implementations. Dual-polarized transmissions (e.g., from the satellite 105 of FIG. 1) may be received by gateway antenna 110-*a* and forwarded to the gateway 115-*a*. The gateway 115-*a* includes a sample clock 310, A/D converters 205-*a*, an interference canceller 220-*a*, and demodulators 330. For a given set of received transmissions at gateway 115-*a*, the signal from each polarity may be transmitted from the same, or different, sources. The received transmissions are separated (by various gateway 115-*a* components not shown) into analog I and Q signals in each polarity.

In one embodiment, the analog I and Q signals from each polarity are digitized using four A/D converters 205-*a* locking to the same sample clock 310. For purposes of reference in the drawings, a first polarization (e.g., horizontal) may be referred to as polarization 1, and the orthogonal polarization (e.g., vertical) may be referred to as polarization 2 (thus, the first polarization includes I1 and Q1, and the second polarization includes I2 and Q2). Thus, each of the four analog signals is converted into a digital signal (I1 signal 315-*a*, Q1 signal 315-*b*, I2 signal 315-*c*, Q2 signal 315-*d*). In one embodiment, the sample rate may be two times the highest symbol rate.

The gateway 115-*a* includes an interference canceller 220-*a*. In one embodiment, the interference canceller 220-*a* is a digital module plugged immediately after the A/D converters 205-*a* and before other demodulator modules 330. This integration may be more straightforward than with other options, since fewer changes may be needed for the down-the-line symbol timing recovery and carrier recovery in the demodulation modules 330.

Assume that an imperfect propagation field and antenna alignment issues cause cross-polar interference. Additionally, even within a single polarization, the received I and Q signals may not be perfectly orthogonal, causing interference. In one embodiment, the interference canceller 220-*a* design may remove both cross-polar interference and the I-Q channel interference. In other embodiments, different functional aspects of the interference canceller 220-*a* (e.g., only the cross-polar interference removal) may be used independently. The interference canceller 220-*a* may be substantially implemented digitally, with a series of multipliers and adders.

The interference canceller 220-*a* performs correlation measurements between different ones of the digital signals. The correlation measurements are used to generate correction terms to remove the interference. The corrected digital signals (I1' signal 325-*a*, Q1' signal 325-*b*, I2' signal 325-*c*, Q2' signal 325-*d*) are forwarded for demodulation. In one embodiment, the I1' signal 325-*a* and Q1' signal 325-*b* are forwarded to the horizontal polarization demodulator 330-*a*, and the I2' signal 325-*c* and Q2' signal 325-*d* are forwarded to the vertical polarization demodulator 330-*b*.

Figure 4:
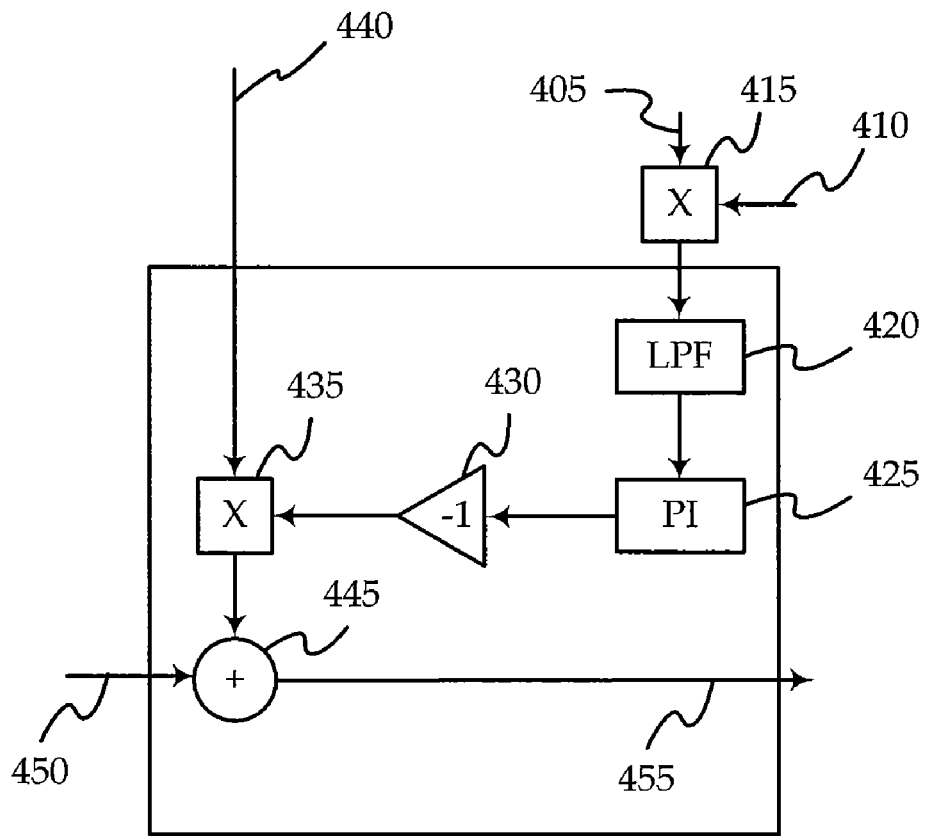
FIG. 4 is a block diagram of an interference canceller configured according to various embodiments of the invention.

Before progressing further with the description, an example of an interference canceller will be discussed. The configuration may be adapted to remove either cross-polar interference or the I-Q channel interference. In the following illustration, removal of the I-Q interference will be used for purposes of example. Referring to FIG. 4, a block diagram of an interference canceller 220-*b* is shown. For purposes of this explanation, assume that a received signal I 405 and signal Q 410 are not perfectly orthogonal, thus causing interference. A correlation measurement between I 405 and Q 410 is taken by correlator 415. The measurement may be generated by taking the product of I 405 with Q 410, and forwarding the measurement to a low pass filter (LPF) 420. Other methods of correlation may be used in other embodiments to use alternatives to measure various similarities between signals.

This measured correlation value is subsequently sent through a proportional integral (PI) 425 (or other integrator). The output of the PI 425 is negated 430, and then multiplied by a multiplier 435 with I channel samples 440 to generate a correction term. Adder 445 adds the correction term to Q channel samples 450 to remove the interference and output a corrected signal 455. Note that other methods may be used to generate a correction term using the correlation.

The bandwidth of the LPF 420 and gains on the PI 425 may be chosen to track the desired rate of the variation of the interference (nominally 2-3 Hz). The interference removal makes the Q channel orthogonal to I channel, and vice versa. In one embodiment, there is no phase alignment of the complex I/Q channels, as this is part of the carrier phase recovery operation to be done in a demodulator (e.g., demodulator 330 of FIG. 3). This method of correlating independent signals may be further leveraged in 4-D cancellation, as well.

While the interference canceller 220-b in FIG. 4 is described so as to identify and remove I-Q channel interference, the configuration may be modified in other embodiments to remove cross-polar interference. For example, in one embodiment a correlator 415 may be configured to measure a correlation between an I1 signal and Q2 signal (e.g., I1 315-a and Q2 315-d). The measured correlation value may subsequently be sent through PI 425. The output of the PI 425 may be negated 430, and then multiplied by a multiplier 435 with I1 channel samples to generate a correction term. Adder 445 may add the correction term to Q2 channel samples, thereby removing the cross-polar I1 interference from Q2.

To leverage aspects of the interference canceller 220-b design for a 4-D canceller, the additional interference terms may be estimated and removed. Consider the four signals of FIG. 3: I1 signal 315-a, Q1 signal 315-b, I2 signal 315-c, Q2 signal 315-d. To analyze the corrections, refer to the following matrix table:

TABLE 1

|    | I1 | Q1 | I2 | Q2 |
|----|----|----|----|----|
| I1 | 1  | x1 | y1 | y2 |
| Q1 | x1 | 1  | y3 | y4 |
| I2 | y1 | y3 | 1  | x2 |
| Q2 | y2 | y4 | x2 | 1  |

In one embodiment, six correlations are performed to obtain the correction terms, x1, x2, y1, y2, y3, and y4. The x1 term may be used to impart a correction to I1 315-a from Q1 315-b, or vice versa. Similarly the x2 term is used to impart a correction to I2 315-c from Q2 315-d, or vice versa.

However, in one embodiment the y1 term is used to impart a correction to I1 315-a from I2 315-c as well as to impart a correction to I2 315-c from I1 315-a. This two-way correction may be used to more completely eliminate the effect of I2 on I1, and vice versa. In one embodiment, therefore, these two signals are not "rotated" with respect to each other like I & Q signals are. Similarly the y2, y3, and y4 terms may be used to generate corrections in both directions. In yet another embodiment, there are different correlations for each way of a two-way correction (e.g., a first correlation and first correction term to impart correction to I1 315-a from I2 315-c, and a second correlation and second correction term to impart correction to I2 315-c from I1 315-a).

Figure 5:
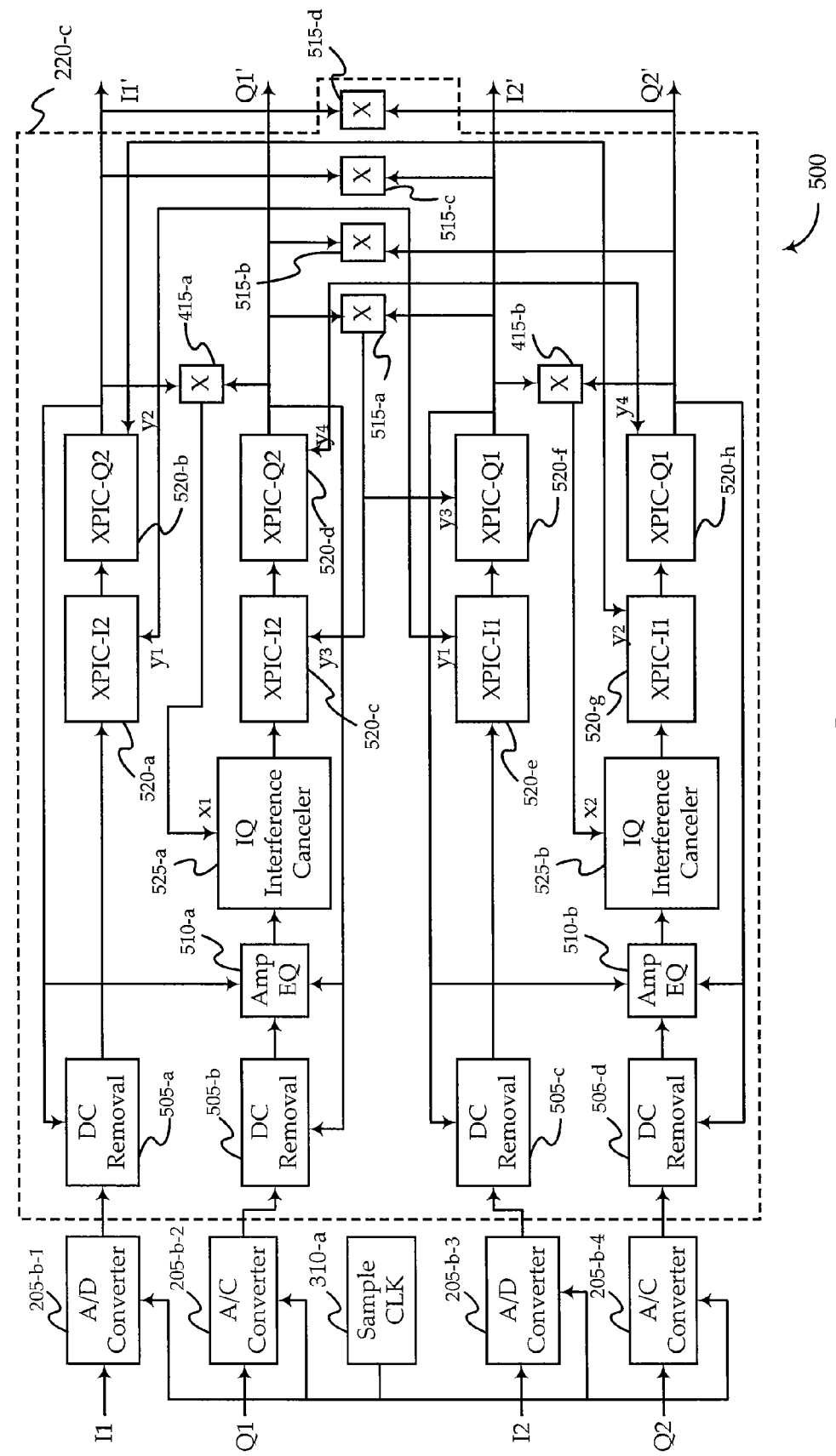
FIG. 5 is a block diagram of a device for interference cancellation configured according to various embodiments of the invention.

Referring next to FIG. 5, a block diagram illustrates an example configuration 500 of selected components of a device, which may be the gateway 115, terminal 130, or satellite 105 of FIG. 1. The configuration 500 includes sample clock 310-a, A/D converters 205-b, and interference canceller 220-c. Received analog I and Q signals from each polarity may be digitized using four A/D converters 205 locking to the same sample clock 310-a. The four digitized signals (which may be I1 signal 315-a, Q1 signal 315-b, I2 signal 315-c, Q2 signal 315-d) are again forwarded to interference canceller 220-c. The interference canceller 220-c in this embodiment includes DC removal unit(s) 505, amplitude equalizer unit(s) 510, correlators 415, 515, IQ channel interference cancellation unit 525, and cross-polarization interference cancellation units 520.

The four digitized signals I1, Q1, I2, and Q2 are received by the cross-polar interference canceller 220-c. DC removal for each of the signals may be performed by DC removal units 505, and amplitude equalizer units 510 may be configured to equalize amplitudes in I and Q channels for each polarity.

Refer first to the signal generated from DC removal unit 505-a, the I1 signal. Referring to Table 1, the I1 signal is to be correlated with each of the other three signals to generate correlation measurements x1, y1, and y2. Referring to FIG. 5, correlator 515-c correlates the I1 and I2 signals to generate measurement y1, correlator 515-d correlates the I1 and Q2 signals to generate measurement y2, and correlator 515-a correlates the I1 and Q1 signals to generate measurement x1.

Measurement y1 may then be used by cross-polarization interference cancellation unit 520-a to generate a correction term and remove the cross-polarization interference of the I2 signal from the I1 signal (e.g., using a proportional integrator processing the filtered y1 measurement to produce an output, and negating the output to generate a correction term to add to the I1 signal).

Measurement y2 may then be used by cross-polarization interference cancellation unit 520-b to generate a correction term and remove the cross-polarization interference of the Q2 signal from the I1 signal. Measurement x1 may then be used by IQ interference cancellation unit 525-a to generate a correction term to remove the I-Q channel interference of the I1 signal from the Q1 signal (note that in this embodiment, this correction takes place only once for the Q1 signal, and thus not for the I1 signal).

Refer next to the signal generated from DC removal unit 505-b, the Q1 signal. Referring to Table 1, the Q1 signal is to be correlated with each of the other three signals to generate correlation measurements x1, y3, and y4. Referring to FIG. 5, correlator 515-a correlates the Q1 and I2 signals to generate measurement y3, correlator 515-b correlates the Q1 and Q2 signals to generate measurement y4, and correlator 515-a correlates the I1 and Q1 signals to generate measurement x1.

Measurement y3 may then be used by cross-polarization interference cancellation unit 520-c to generate a correction term and remove the cross-polarization interference of the I2 signal from the Q1 signal (e.g., using a proportional integrator processing the filtered y3 measurement to produce an output, and negating the output to generate a correction term to add to the Q1 signal).

Measurement y4 may then be used by cross-polarization interference cancellation unit 520-d to generate a correction term and remove the cross-polarization interference of the Q2 signal from the Q1 signal. Measurement x1 may then be used by IQ interference cancellation unit 525-*a* to generate a correction term to remove the I-Q channel interference of the I1 signal from the Q1 signal.

The above explanation refers to removal of interference from the I1 and Q1 signals, but note that in one embodiment the cross-polar interference canceller 220-*c* also performs similar cross polar and IQ interference measurement and removal for the I2 and Q2 signals.

In certain embodiments, the cross-polar interference canceller 220 may be implemented with the following components. The following implementation is for purposes of example only. Correlators 415, 515 may be implemented with a multiplier used to find the correlation between two ideally orthogonal signals. For a proportional integrator (e.g., PI 425) used in an interference canceller, the P path as well as the I path may be implemented with one multiplier each (for applying different gains on the P and I terms). The I path may also include an accumulator (adder). Another adder may be used to sum the results from both the P and I paths. Some glue logic may be used to prevent any clipping of the I path accumulated result as well as the overall sum of the P and I paths.

For an LPF (e.g., LPF 420) used in an interference canceller 220, the LPF may be an averager over some block of data or a first order IIR filter (if the bandwidth is chosen properly, the multiply can be implemented with a simple shift). Thus, the LPF may be implemented with one or two adders and some glue logic. For DC removal 505 in the interference canceller 220, there may be an implementation with one PI loop, one LPF, one adder (to subtract out the DC component) and some glue logic. An Amplitude Equalizer 510 in the cross-polar interference canceller 220-*c* may be implemented with one adder (to find the amplitude imbalance), one LPF, one PI loop, one multiplier (to scale the amplitude), and some glue logic.

The design illustrated with the interference canceller 220-*c* of FIG. 5 may, therefore, include six correlators 415, 515, four DC removal units 505, two equalizer units 510, two IQ channel interference cancellation units 525, and eight cross-polarization interference cancellation units 520. In one embodiment, therefore, the interference canceller 220 is implemented with a total of 44 multipliers, 56 adders, and some glue logic.

In one embodiment, the cross-polar interference canceller 220-*c* is an all-digital module that takes in 4 channels of signals with substantial cross-polar interference at sample rate, and outputs 4 channels of cleaner signals with mitigated interference also at sample rate. A sample-based implementation may be independent of the symbol timing and frequency recovery. The sample clock may be independent of the symbol clock, as symbol timing may be recovered with an interpolating filter and an NCO in a demodulator (e.g., demodulator 330 of FIG. 3). This also allows for different symbol timing resolutions over a wide variety of symbol rates. Such a system may be well suited to an all digital modem where clocking from the A/D is independent of symbol timing recovery clocks.

The dual-polar cancellation techniques described with reference to interference canceller 220 may be a digitally implemented module that can be integrated into various digital demodulators. In some embodiments, the units and/or functionality of the cross-polar interference canceller 220 (or the satellite 105, terminal 130, or gateway 115 of FIG. 1, or, device 200 of FIG. 2) may individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 6:
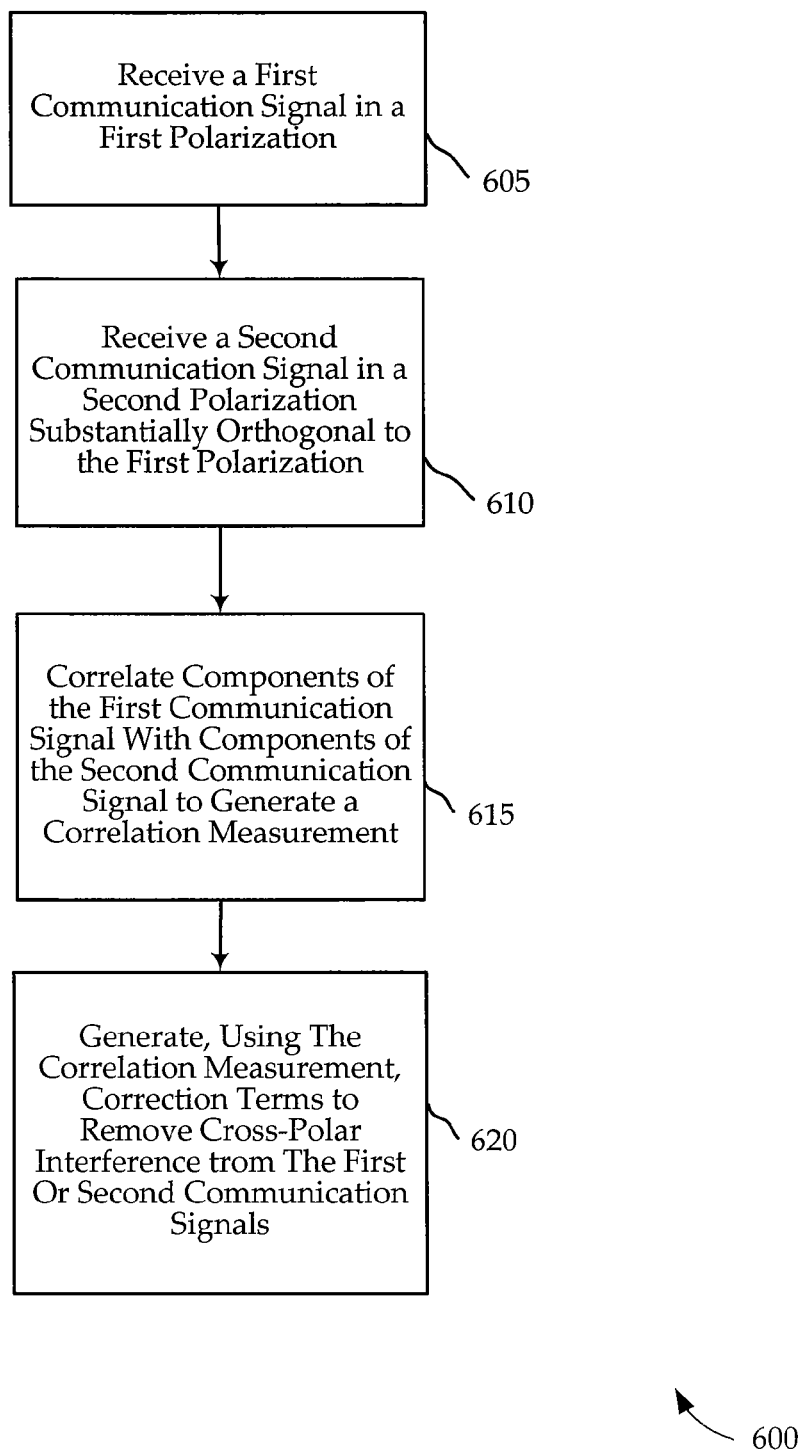
FIG. 6 is a flowchart illustrating a method of generating correction terms for cross-polar interference cancellation in a communication signal according to various embodiments of the invention.

FIG. 6 is a flowchart illustrating a method of generating correction terms for cross-polar interference cancellation in a communications signal according to various embodiments of the invention. The method 600 may, for example, be performed in whole or in part on the gateway 115, terminal 130 or satellite 105, of FIG. 1, the device of FIG. 2 or, more specifically, the interference canceller 220 of FIG. 2, 3, 4, or 5.

At block 605, a first communication signal in a first polarization is received. At block 610, a second communication signal in a second polarization substantially orthogonal to the first polarization is received. At block 615, components of the first communication signal are correlated with components of the second communication signal to generate a correlation measurement. At block 620, using the correlation measurement, correction terms are generated to remove cross-polar interference from the first or second communication signals.

Figure 7:
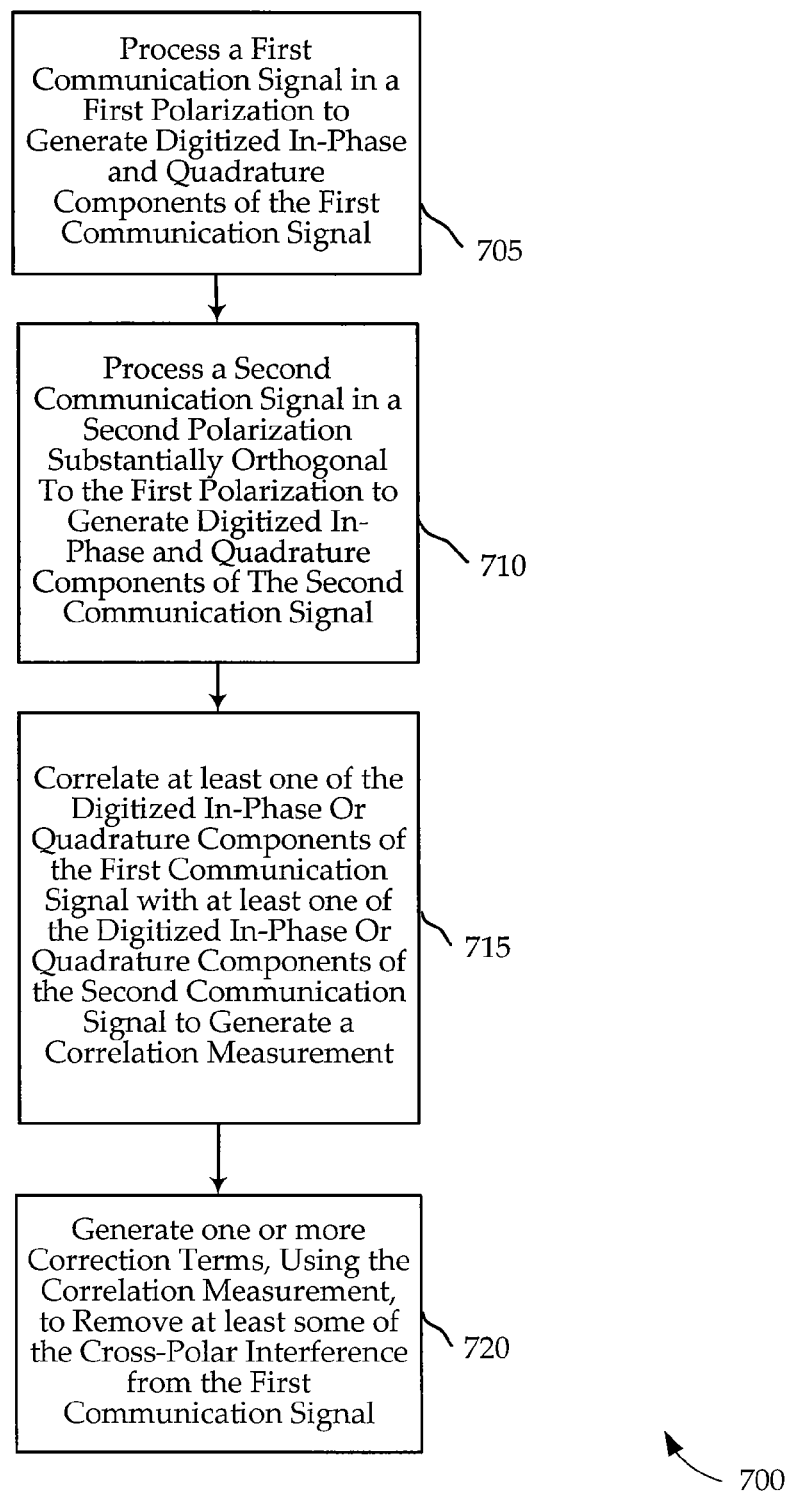
FIG. 7 is a flowchart illustrating a method of generating correction terms for cross-polar interference cancellation using digitized in-phase and quadrature components of a communication signal according to various embodiments of the invention.

FIG. 7 is a flowchart illustrating a method of generating correction terms for cross-polar interference cancellation using digitized in-phase and quadrature components of a communication signal according to various embodiments of the invention. The method 700 may, for example, be performed in whole or in part on the gateway 115, terminal 130 or satellite 105, of FIG. 1, the device of FIG. 2 or, more specifically, the interference canceller 220 of FIG. 2, 3, 4, or 5.

At block 705, a first communication signal in a first polarization is processed to generate digitized in-phase and quadrature components of the first communication signal. At block 710, a second communication signal in a second polarization substantially orthogonal to the first polarization is processed to generate digitized in-phase and quadrature components of the second communication signal. At block 715, at least one of the digitized in-phase or quadrature components of the first communication signal is correlated with at least one of the digitized in-phase or quadrature components of the second communication signal to generate a correlation measurement. At block 720, one or more correction terms are generated, using the correlation measurement, to remove at least some of the cross-polar interference from the first communication signal.

Figure 8A:
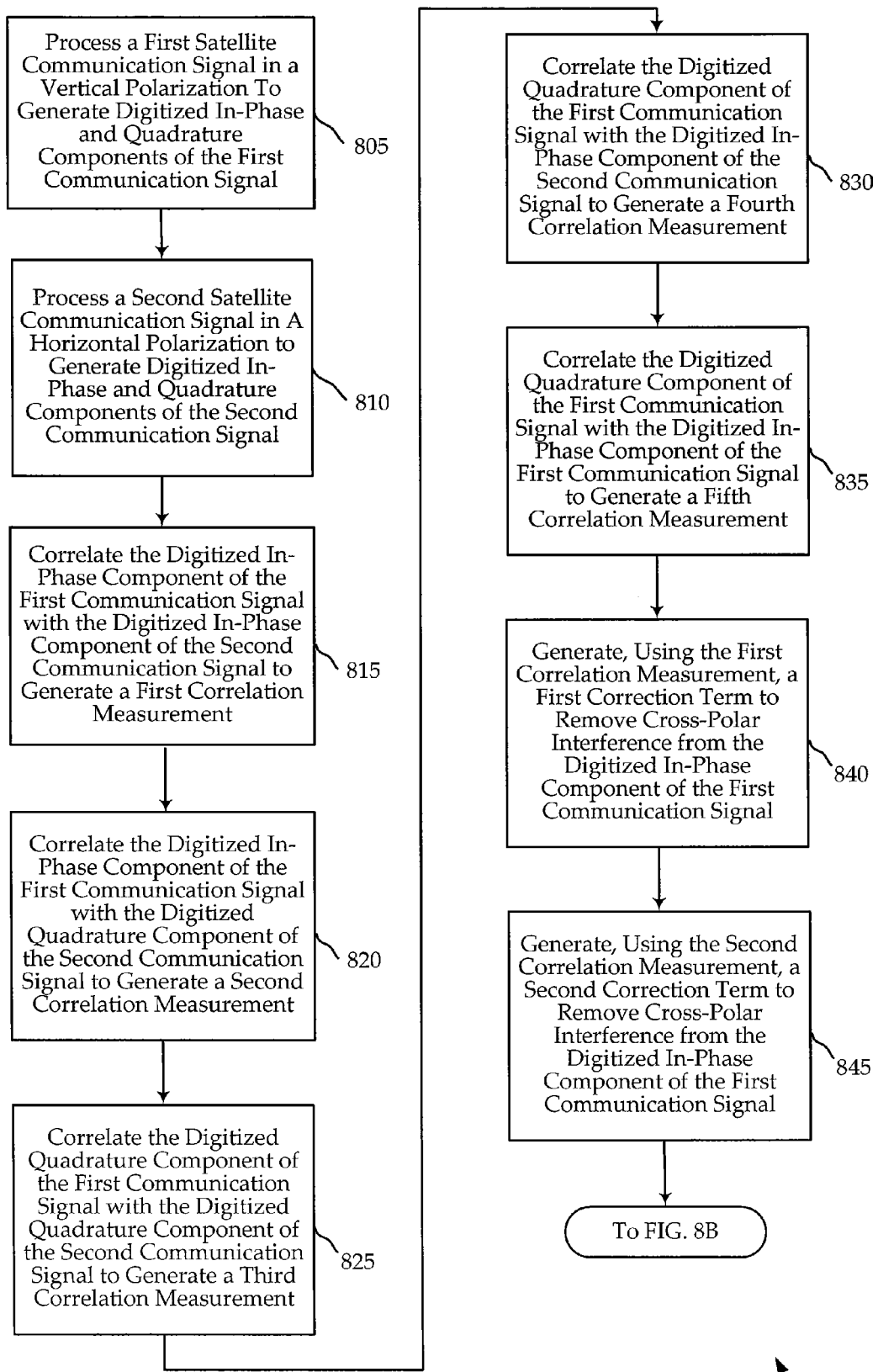
FIGS. 8A-8B are flowcharts illustrating a method of generating correction terms for interference cancellation using digitized in-phase and quadrature components of a communication signal according to various embodiments of the invention.
Figure 8B:
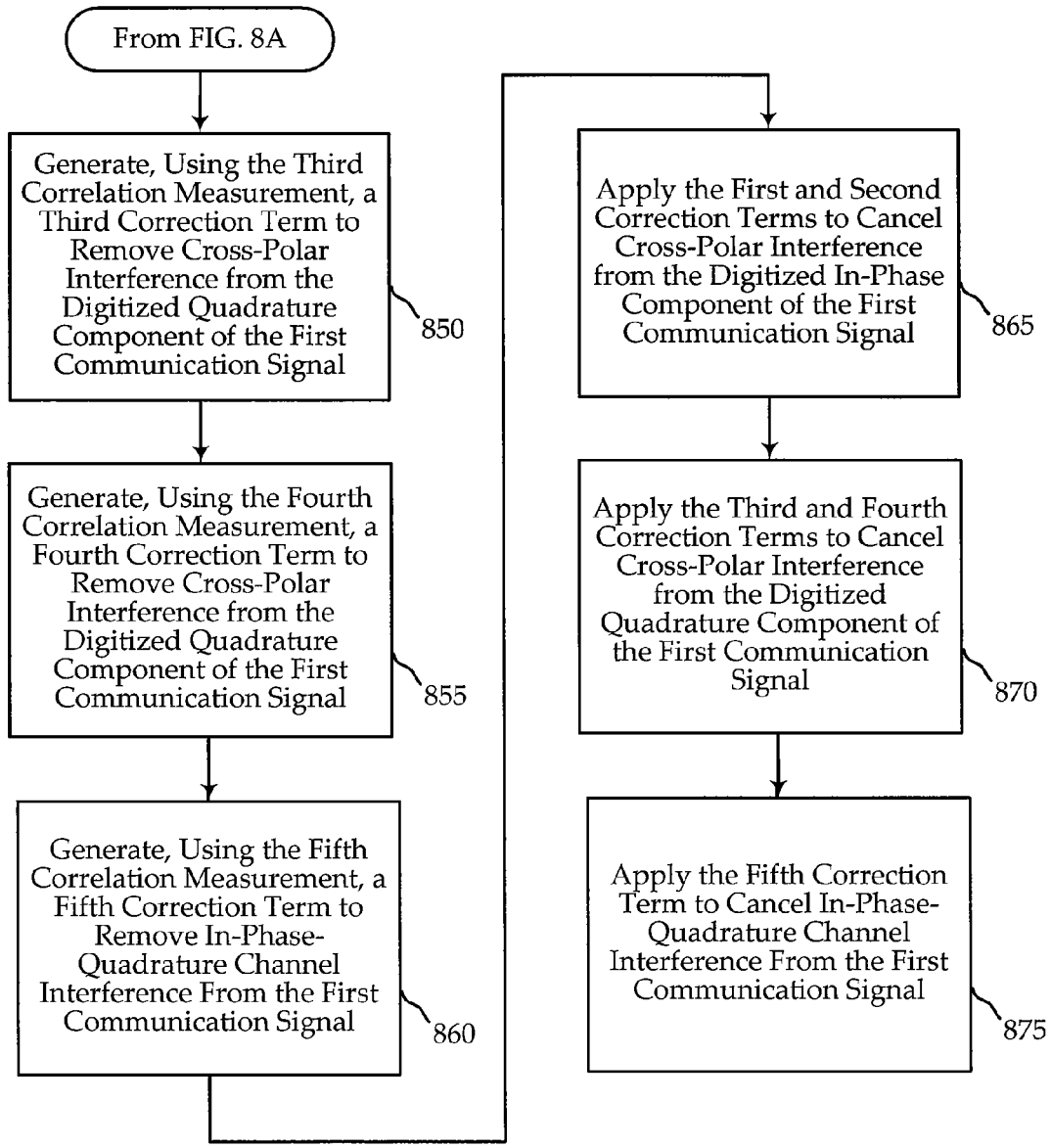

FIGS. 8A-8B are flowcharts illustrating a method of generating correction terms for interference cancellation using digitized in-phase and quadrature components of a communication signal according to various embodiments of the invention. The method 800 may, for example, be performed in whole or in part on the gateway 115, terminal 130 or satellite 105, of FIG. 1, the device of FIG. 2 or, more specifically, the interference canceller 220 of FIG. 2, 3, 4, or 5.

At block 805, a first satellite communication signal in a vertical polarization is processed to generate digitized in-phase and quadrature components of the first communication signal. At block 810, a second satellite communication signal in a horizontal polarization is processed to generate digitized in-phase and quadrature components of the second communication signal.

At block 815, the digitized in-phase component of the first communication signal is correlated with the digitized in-phase component of the second communication signal to generate a first correlation measurement. At block 820, the digitized in-phase component of the first communication signal is correlated with the digitized quadrature component of the second communication signal to generate a second correlation measurement. At block 825, the digitized quadrature component of the first communication signal is correlated with the digitized quadrature component of the second communication signal to generate a third correlation measurement. At block 830, the digitized quadrature component of the first communication signal is correlated with the digitized in-phase component of the second communication signal to generate a fourth correlation measurement. At block 835, the digitized quadrature component of the first communication signal is correlated with the digitized in-phase component of the first communication signal to generate a fifth correlation measurement.

At block 840, using the first correlation measurement, a first correction term is generated to remove cross-polar interference from the digitized in-phase component of the first communication signal. At block 845, using the second correlation measurement, a second correction term is generated to remove cross-polar interference from the digitized in-phase component of the first communication signal. At block 850, using the third correlation measurement, a third correction term is generated to remove cross-polar interference from the digitized quadrature component of the first communication signal. At block 855, using the fourth correlation measurement, a fourth correction term is generated to remove cross-polar interference from the digitized quadrature component of the first communication signal. At block 860, using the fifth correlation measurement, a fifth correction term is generated to remove in-phase-quadrature channel interference from the first communication signal.

At block 865, the first and second correction terms are applied to cancel cross-polar interference from the digitized in-phase component of the first communication signal. At block 870, the third and fourth correction terms are applied to cancel cross-polar interference from the digitized quadrature component of the first communication signal. At block 875, the fifth correction term is applied to cancel in-phase-quadrature channel interference from the first communication signal.

It should be noted that the methods, systems, processors, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A device for removing at least some of the cross-polar interference in a dual-polarization system, the device comprising:

an A/D converter unit configured to:
process a first communication signal in a first polarization to generate digitized in-phase and quadrature components of the first communication signal; and
process a second communication signal in a second polarization substantially orthogonal to the first polarization to generate digitized in-phase and quadrature components of the second communication signal;

a correlator unit, communicatively coupled with the A/D converter unit, and configured to correlate the digitized in-phase component of the first communication signal with the digitized in-phase component of the second communication signal to generate a first portion of a correlation measurement; correlate the digitized in-phase component of the first communication signal with the digitized quadrature component of the second communication signal to generate a second portion of the correlation measurement; correlate the digitized quadrature component of the first communication signal with the digitized in-phase component of the second communication signal to generate a third portion of the correlation measurement; and correlate the digitized quadrature component of the first communication signal with the digitized quadrature component of the second communication signal to generate a fourth portion of the correlation measurement; and a cross-polar interference cancellation unit, communicatively coupled with the correlator unit, and configured to:

generate, using the first portion or the correlation measurement, a first correction term to remove at least some of the cross-polar interference from the digitized in-phase component of the first communication signal; generate, using the second portion of the correlation measurement, a second correction term to remove at least some of the cross-polar interference from the digitized in-phase component of the first communication signal; generate, using the third portion correlation measurement, a third correction term to remove at least some of the cross-polar interference from the digitized quadrature component of the first communication signal; and generate, using the fourth portion correlation measurement, a fourth correction term to remove at least some of the cross-polar interference from the digitized quadrature component of the first communication signal.

2. The device of claim 1, further comprising:
an in-phase-quadrature channel interference cancellation unit configured to:
generate an in-phase-quadrature channel interference correction term, using a second correlation measurement from a correlation between the digitized quadrature component of the first communication signal with the digitized in-phase component of the first communication signal; and
remove, using the in-phase-quadrature channel interference correction term, at least a part of the in-phase-quadrature channel interference from the digitized in-phase or quadrature components of the first communication signal.

3. The device of claim 1, further comprising:
a DC removal unit, coupled with the A/D converter unit, and configured to remove at least a portion of a DC component of the digitized in-phase and quadrature components of the first communication signal and the digitized in-phase and quadrature components of the second communication signal; and
an equalizer unit, coupled with the DC removal unit, and configured to:
equalize at least a portion of the digitized in-phase and quadrature components of the first communication signal and the digitized in-phase and quadrature components of the second communication signal; and
forward the equalized components to the correlation unit, wherein the equalized components comprise at least one of the digitized in-phase or quadrature components of the first or second communication signals.

4. The device of claim 1, further comprising:
a sample clock communicatively coupled with the A/D converter unit, the correlator unit, and the cross-polar interference cancellation unit, wherein the cross-polar interference cancellation unit outputs corrected digitized in-phase and quadrature components of the first communication signal at the sample rate; and
a demodulator unit, coupled with the cross-polar interference cancellation unit, configured to output at a symbol rate independent from the sample rate.

5. The device of claim 1, wherein,
the correlator unit and cross-polar interference cancellation unit comprise a digital processor unit; and
the communication signals are received via satellite.

6. A method for removing at least some of the cross-polar interference in a dual-polarization system, the method comprising:
processing a first communication signal in a first polarization to generate digitized in-phase and quadrature components of the first communication signal;
processing a second communication signal in a second polarization substantially orthogonal to the first polarization to generate digitized in-phase and quadrature components of the second communication signal;
correlating the digitized in-phase component of the first communication signal with the digitized in-phase component of the second communication signal to generate a first portion of a correlation measurement;
correlating the digitized in-phase component of the first communication signal with the digitized quadrature component of the second communication signal to generate a second portion of the correlation measurement;
correlating the digitized quadrature component of the first communication signal with the digitized in-phase component of the second communication signal to generate a third portion of the correlation measurement;
correlating the digitized quadrature component of the first communication signal with the digitized quadrature component of the second communication signal to generate a fourth portion of the correlation measurement;
generating, using the first portion of the correlation measurement, a first correction term to remove at least some of the cross-polar interference from the digitized in-phase component of the first communication signal;
generating, using the second portion of the correlation measurement, a second correction term to remove at least some of the cross-polar interference from the digitized in-phase component of the first communication signal;
generating, using the third portion correlation measurement, a third correction term to remove at least some of the cross-polar interference from the digitized quadrature component of the first communication signal; and
generating, using the fourth portion correlation measurement, a fourth correction term to remove at least some of the cross-polar interference from the digitized quadrature component of the first communication signal.

7. The method of claim 6, further comprising:
correlating the digitized in-phase component of the first communication signal with the digitized quadrature component of the first communication signal to generate a second correlation measurement; and
generating an in-phase-quadrature channel interference correction term, using the second correlation measurement, to remove at least some of the in-phase-quadrature channel interference from the first communication signal.

8. The method of claim 6, wherein at least one of the correlating steps comprises:
calculating the product of the respective digitized component of the first communication signal and the respective digitized component of the second communication signal; and
low pass filtering the product to generate the respective portion of the correlation measurement.

9. The method of claim 6, wherein at least one of the generating steps comprises:
processing the respective portion of the correlation measurement using a proportional integral unit;
negating the processed portion of the correlation measurement; and
multiplying the negated portion of the correlation measurement with the respective digitized component of the first communication signal to generate the respective correction term.

10. The method of claim 6, wherein,
the method is performed by a satellite communications system;
the first polarization comprises a substantially vertical polarization; and
the second polarization comprises a substantially horizontal polarization.

11. A processor for removing at least some of the cross-polar interference in a dual-polarization system, the processor configured to:
provide digitized in-phase and quadrature components of a first communication signal in a first polarization;
provide digitized in-phase and quadrature components of a second communication signal in a second polarization substantially orthogonal to the first polarization;
correlate the digitized in-phase component of the first communication signal with the digitized in-phase component of the second communication signal to generate a first portion of a correlation measurement;
correlate the digitized in-phase component of the first communication signal with the digitized quadrature component of the second communication signal to generate a second portion of the correlation measurement;
correlate the digitized quadrature component of the first communication signal with the digitized in-phase component of the second communication signal to generate a third portion of the correlation measurement;
correlate the digitized quadrature component of the first communication signal with the digitized quadrature component of the second communication signal to generate a fourth portion of the correlation measurement;
generate, using the first portion of the correlation measurement, a first correction term to remove at least some of the cross-polar interference from the digitized in-phase component of the first communication signal;
generate, using the second portion of the correlation measurement, a second correction term to remove at least some of the cross-polar interference from the digitized in-phase component of the first communication signal;
generate, using the third portion correlation measurement, a third correction term to remove at least some of the cross-polar interference from the digitized quadrature component of the first communication signal; and
generate, using the fourth portion correlation measurement, a fourth correction term to remove at least some of the cross-polar interference from the digitized quadrature component of the first communication signal.

12. A method for removing at least some of the cross-polar interference from a signal received in a dual-polarization system, the method comprising:
receiving a first communication signal in a first polarization;
receiving a second communication signal in a second polarization substantially orthogonal to the first polarization;
correlating a digitized in-phase component of the first communication signal with a digitized in-phase component of the second communication signal to generate a first portion of a correlation measurement;
correlating the digitized in-phase component of the first communication signal with a digitized quadrature component of the second communication signal to generate a second portion of the correlation measurement;
correlating a digitized quadrature component of the first communication signal with the digitized in-phase component of the second communication signal to generate a third portion of the correlation measurement;
correlating the digitized quadrature component of the first communication signal with the digitized quadrature component of the second communication signal to generate a fourth portion of the correlation measurement;
generating, using the first portion of the correlation measurement, a first correction term to remove at least some of the cross-polar interference from the digitized in-phase component of the first communication signal;
generating, using the second portion of the correlation measurement, a second correction term to remove at least some of the cross-polar interference from the digitized in-phase component of the first communication signal;
generating, using the third portion correlation measurement, a third correction term to remove at least some of the cross-polar interference from the digitized quadrature component of the first communication signal; and
generating, using the fourth portion correlation measurement, a fourth correction term to remove at least some of the cross-polar interference from the digitized quadrature component of the first communication signal.

13. The method of claim 12, wherein,
the first communication signal and the second communication signal comprise digitized versions of analog communication signals.

14. A system for removing at least some of the cross-polar interference in a dual-polarization system, the system comprising:
a first transmitting terminal configured to transmit a first communication signal in a first polarization;
a second transmitting terminal configured to transmit a second communication signal in a second polarization substantially orthogonal to the first polarization; and
a receiving terminal configured to:
receive the first and second communication signals;
generate digitized in-phase and quadrature components of the first communication signal;
generate digitized in-phase and quadrature components of the second communication signal;
correlate the digitized in-phase component of the first communication signal with the digitized in-phase component of the second communication signal to generate a first portion of a correlation measurement;
correlate the digitized in-phase component of the first communication signal with the digitized quadrature component of the second communication signal to generate a second portion of the correlation measurement;
correlate the digitized quadrature component of the first communication signal with the digitized in-phase component of the second communication signal to generate a third portion of the correlation measurement;
correlate the digitized quadrature component of the first communication signal with the digitized quadrature component of the second communication signal to generate a fourth portion of the correlation measurement;
generate, using the first portion of the correlation measurement, a first correction term to remove at least some of the cross-polar interference from the digitized in-phase component of the first communication signal;
generate, using the second portion of the correlation measurement, a second correction term to remove at least some of the cross-polar interference from the digitized in-phase component of the first communication signal;

generate, using the third portion correlation measurement, a third correction term to remove at least some of the cross-polar interference from the digitized quadrature component of the first communication signal; and generate, using the fourth portion correlation measurement, a fourth correction term to remove at least some of the cross-polar interference from the digitized quadrature component of the first communication signal.

15. The system of claim 14, wherein, the system comprises a satellite communications system;

the transmitting terminals are ground terminals configured to transmit the communication signals via satellite; and the receiving terminal is a gateway terminal configured to receive the communication signal via the satellite.

16. The device of claim 1, wherein the cross-polar interference cancellation unit is further configured to generate, using one or more of the portions of the correlation measurement, one or more additional correction terms to remove at least some of the cross-polar interference from at least one of the digitized in-phase and quadrature components of the second communication signal.

17. The device of claim 2, wherein the in-phase-quadrature channel interference cancellation unit is further configured to:

generate a second in-phase-quadrature channel interference correction term, using a third correlation measurement from a correlation between the digitized quadrature component of the second communication signal with the digitized in-phase component of the second communication signal; and remove, using the second in-phase-quadrature channel interference correction term, at least a part of the in-phase-quadrature channel interference from the digitized in-phase or quadrature components of the second communication signal.

18. The method of claim 6, further comprising generating, using one or more of the portions of the correlation measurement, one or more additional correction terms to remove at least some of the cross-polar interference from at least one of the digitized in-phase and quadrature components of the second communication signal.

19. The method of claim 7, further comprising:

correlating the digitized in-phase component of the second communication signal with the digitized quadrature component of the second communication signal to generate a third correlation measurement; and generating a second in-phase-quadrature channel interference correction term, using the third correlation measurement, to remove at least some of the in-phase-quadrature channel interference from the second communication signal.

20. The processor of claim 11, wherein the processor is further configured to generate, using one or more of the portions of the correlation measurement, one or more additional correction terms to remove at least some of the cross-polar interference from at least one of the digitized in-phase and quadrature components of the second communication signal.

21. The processor of claim 11, wherein the processor is further configured to:

generate an in-phase-quadrature channel interference correction term, using a second correlation measurement from a correlation between the digitized quadrature component of the first communication signal with the digitized in-phase component of the first communication signal; and remove, using the in-phase-quadrature channel interference correction term, at least a part of the in-phase-quadrature channel interference from the digitized in-phase or quadrature components of the first communication signal.

22. The method of claim 12, further comprising generating, using one or more of the portions of the correlation measurement, one or more additional correction terms to remove at least some of the cross-polar interference from at least one of the digitized in-phase and quadrature components of the second communication signal.

23. The method of claim 12, further comprising:

correlating the digitized in-phase component of the first communication signal with the digitized quadrature component of the first communication signal to generate a second correlation measurement; and generating an in-phase-quadrature channel interference correction term, using the second correlation measurement, to remove at least some of the in-phase-quadrature channel interference from the first communication signal.

24. The system of claim 14, wherein the receiving terminal is further configured to generate, using one or more of the portions of the correlation measurement, one or more additional correction terms to remove at least some of the cross-polar interference from at least one of the digitized in-phase and quadrature components of the second communication signal.

25. The system of claim 14, wherein the receiving terminal is further configured to:

generate an in-phase-quadrature channel interference correction term, using a second correlation measurement from a correlation between the digitized quadrature component of the first communication signal with the digitized in-phase component of the first communication signal; and remove, using the in-phase-quadrature channel interference correction term, at least a part of the in-phase-quadrature channel interference from the digitized in-phase or quadrature components of the first communication signal.

* * * * *